United States Patent
Plattner et al.

(10) Patent No.: US 10,089,142 B2
(45) Date of Patent: Oct. 2, 2018

(54) DYNAMIC TASK PRIORITIZATION FOR IN-MEMORY DATABASES

(71) Applicant: Hasso-Plattner-Institut für Softwaresystemtechnik GmbH, Potsdam (DE)

(72) Inventors: Hasso Plattner, Schriesheim (DE); Martin Grund, Fribourg (CH); Johannes Wust, Berlin (DE)

(73) Assignee: Hasso-Plattner-Institut Fur Softwaresystemtechnik GmbH, Potsdam (DE)

( * ) Notice: Subject to any disclaimer, the term of this patent is extended or adjusted under 35 U.S.C. 154(b) by 76 days.

(21) Appl. No.: 14/463,863

(22) Filed: Aug. 20, 2014

(65) Prior Publication Data
US 2015/0058858 A1    Feb. 26, 2015

Related U.S. Application Data

(60) Provisional application No. 61/868,157, filed on Aug. 21, 2013.

(51) Int. Cl.
 G06F 9/48    (2006.01)
 G06F 9/50    (2006.01)

(52) U.S. Cl.
 CPC .......... *G06F 9/4881* (2013.01); *G06F 9/5038* (2013.01); *G06F 9/5027* (2013.01)

(58) Field of Classification Search
 CPC ............................... G06F 9/4881; G06F 8/433
 USPC ........................................................ 718/103
 See application file for complete search history.

(56) References Cited

U.S. PATENT DOCUMENTS

| | | | | |
|---|---|---|---|---|
| 5,247,677 | A * | 9/1993 | Welland | G06F 9/4881 718/103 |
| 6,757,897 | B1 * | 6/2004 | Shi | G06F 9/4843 710/240 |
| 7,213,084 | B2 * | 5/2007 | Ogilvie | G06F 13/28 710/22 |

(Continued)

OTHER PUBLICATIONS

Kompass et al ;"Managing Long-Running Queries";"2009";"12 pages".*

(Continued)

*Primary Examiner* — Wei Zhen
*Assistant Examiner* — Brahim Bourzik
(74) *Attorney, Agent, or Firm* — Fountainhead Law Group P.C.

(57) ABSTRACT

The present invention provides methods and system, including computer program products, implementing and using techniques for providing tasks of different classes with access to CPU time provided by worker threads of a database system. In particular, the invention relates to such a database-system-implemented method comprising the following steps: inserting the tasks to a queue of the database system; and executing the tasks inserted to the queue by worker threads of the database system according to their order in the queue; characterized in that the queue is a priority queue; and in that the method further comprises the following steps: assigning each class to a respective priority; and in that the step of inserting the tasks to the queue includes: associating each task with the respective priority assigned to its class.

20 Claims, 7 Drawing Sheets

(56) References Cited

U.S. PATENT DOCUMENTS

| | | | | |
|---|---|---|---|---|
| 7,673,305 | B2* | 3/2010 | Backer | G06F 9/4887 718/102 |
| 8,266,624 | B2* | 9/2012 | Eigler | G06F 9/4843 709/201 |
| 8,332,857 | B1* | 12/2012 | Brown | G06F 17/30463 707/718 |
| 8,656,145 | B2* | 2/2014 | Plondke | G06F 9/4818 712/244 |
| 8,782,653 | B2* | 7/2014 | Gibson | G06F 1/3206 718/103 |
| 9,858,124 | B1* | 1/2018 | Ghare | G06F 9/5083 |
| 2005/0262507 | A1 | 11/2005 | Langen et al. | |
| 2009/0007123 | A1* | 1/2009 | Sreedharan | G06F 9/4887 718/103 |
| 2010/0153957 | A1* | 6/2010 | Xu | G06F 9/505 718/102 |
| 2011/0071981 | A1* | 3/2011 | Ghosh | G06F 11/2025 707/634 |
| 2011/0072217 | A1* | 3/2011 | Hoang | G06F 12/084 711/130 |
| 2012/0221788 | A1* | 8/2012 | Raghunathan | G06F 17/16 711/114 |
| 2012/0284228 | A1* | 11/2012 | Ghosh | G06F 17/30581 707/615 |
| 2013/0060780 | A1* | 3/2013 | Lahiri | H03M 7/3088 707/741 |
| 2013/0191369 | A1* | 7/2013 | Barsness | G06F 9/5083 707/716 |
| 2015/0026688 | A1* | 1/2015 | Dice | G06F 9/467 718/102 |
| 2015/0088813 | A1* | 3/2015 | Lahiri | G06F 17/30292 707/609 |
| 2016/0210332 | A1* | 7/2016 | Milton | G06F 17/30551 |

OTHER PUBLICATIONS

"Edwards et al";"Understanding Analytic Workloads";"Mar. 15, 2011";"19 pages".*

Hongjun Lu, et al.; "Dynamic and Load-balanced Task-Oriented Database Query Processing in Parallel Systems"; Department of Information Systems and Computer Science, National University of Singapore; 1992; pp. 357-372; 16 pages.

Hasso Plattner; "SanssouciDB: An In-Memory Database for Processing Enterprise Workloads"; Hasso-Plattner Institute, University of Potsdam; 2011; 20 pages.

Sivaramakrishnan Narayanan, et al; "Dynamic Prioritization of Database Queries"; Greenplum, Inc.; 2011; 10 pages.

Jens Krueger, et al.; "Fast Updates on Read-Optimized Databases Using Multi-Core CPUs"; Journal; Proceedings of the VLDB Endowment, vol. 5, Issue 1; Sep. 2011; pp. 61-72 (12 pages).

Martin Grund, et al.; "Hyrise—A Main Memory Hybrid Storage Engine"; Journal; Proceedings of the VLDB Endowment; vol. 4, Issue 2; Nov. 2010; pp. 105-116 (12 pages).

Extended EP Search Report for EP Appln. No. 13181258.8 dated Mar. 31, 2014, 10 pages.

Johannes Wust: "Mixed Workload Management for In-Memory Databases", VLDB 2011 PhD Workshop, Aug. 29-Sep. 3, 2011, Seattle, USA, Retrieved from the Internet: URL:http://ares.epic.hpi.uni-potsdam.de/apps/static/papers/p6-JohannesWust.pdf.

Chetan Gupta et al.: "Fair, effective, efficient and differentiated scheduling in an enterprise data warehouse", Extending Database Technology; Mar. 24, 2009, pp. 696-707.

Dan Graham: "Eliminate traffic jams Dynamic workload management keeps your data moving", Dec. 1, 2007, pp. 1-3, Retrieved from the Internet: URL:https://web.archive.org/web/20121113223448/http://apps.teradata.com/tdmo/v07n04/pdf/AR5477.pdf.

Sivaramakrishnan Narayanan et al.: "Dynamic prioritization of database queries", 2011 IEEE 27th International Conference on Data Engineering, Apr. 1, 2011, pp. 1232-1241.

Article entitled: "Thread (computing)" from Wikipedia; Jun. 16, 2017; https://en.wikipedia.org/wiki/Thread_(computing); 10 pages.

Article entitled: "Traffic Control in a Multiplexed Computer System"; Jerome Howard Saltzer, Jul. 1966; 92 pages.

Article entitled: "Computer Multitasking" from Wikipedia; Jun. 16, 2017; https://en.wikipedia.org/wiki/Computer_multitasking; 5 pages.

Article entitled: "Get Faster Performance for Many Demanding Business Applications"; Intel Hyper-Threading Technology; Jun. 16, 2017; https://www.intel.com/content/www/us/en/architecture-and-technology/hyper-threading/hyper-threading-technology.html; 2 pages.

* cited by examiner

DYNAMIC TASK PRIORITIZATION FOR IN-MEMORY DATABASES

CROSS REFERENCE TO RELATED APPLICATIONS

The present disclosure claims priority to U.S. Provisional App. No. 61/868,157 filed Aug. 21, 2013, which is incorporated herein by reference.

BACKGROUND

The present invention generally relates to the field of database systems, more particularly, to the field of CPU time management in such systems. Specifically, the invention is directed at a method and a database system that are suitable for providing database tasks with access to CPU time provided by the database system. Moreover, the invention is directed at a computer program product directly loadable into a memory of a computer, the computer program product comprising software code portions for performing the method according to the invention when said product is run on a computer.

PRIOR ART

Recently, in-memory database management systems (generally abbreviated as IMDBMS) have been introduced that run both transactional and analytical applications combined on a single database instance. These IMDBMS are fast because they use massive intra-query parallelism on multi-core processors, primary data storage in main memory, and column store techniques. Moreover, analytical applications become largely independent of data staging delays when they are run on a database instance that simultaneously runs transactional applications. As a result thereof, complex analytical queries issued against such IMDBMS require execution times that are only in the order of seconds.

However, combining transactional and analytical applications on the same database instance leads to heterogeneous queries and imposes significant problems on resource management systems known in the prior art. Some of them are described in the following:

A first problem is that conventional resource management systems cannot guarantee execution of newly arriving transactional queries in a timely manner when complex analytical queries are simultaneously executed. Although queries are executed very fast on IMDBMS, execution time is still constrained by bottleneck resources such as CPU cycles or main memory access. Time-consuming analytical queries, which typically have execution times in the order of seconds, may block access to CPU time for transactional queries that typically must be executed within milliseconds because conventional resource management systems schedule queries strictly in a first-in-first-out manner without taking the execution time of the queries into account.

The following is a simplified example scenario, in which the first problem arises: Business transactions of a web shop are recorded and archived in an IMDBMS. Transactional and analytical applications run on the same database instance. The IMDBMS has a conventional resource management system. When the owner of the web shop issues an extensive real-time analytical query, the CPU times of the IMDBMS are completely blocked for at least a few seconds. When a customer of the web shops tries to place an order, the web shop cannot record this order in the database because recording requires the processing of a transactional query. Only when the IMDBMS has completed the analytical query and CPU time can be allocated to the transactional query, the web shop can record this order. For the customer of the web shop, such behaviour results in waiting times in the order of seconds. This is not acceptable. Transactional queries must always be carried out within milliseconds even when an analytical query is carried out simultaneously.

A second problem is that conventional resource management systems do not enforce that every class of queries obtains a fair fraction of CPU time. This shortcoming becomes clear from the following simplified example scenario: Two users are connected to the database system and simultaneously and continuously issue a large number of analytical queries at a very high rate so that a queue builds up in the database system, the queue consisting of alternating first and second queries. The first user issues queries that require 100 ms CPU time and the second user issues queries that require 900 ms CPU time. The database system has only one processing unit so that the queries are sequentially executed according to the queue order. The average response time for the queries will be dominated by the wait latency caused by the longer first query and will quickly approach 1000 ms. Accordingly, the longer first query will account for 90% of the CPU time fraction spent on executing both of these tasks, while the shorter second query will account for only 10%. Thereby, to obtain the results for all queries issued, the first session has to wait just as long as the second session, although the queries of the first session make up for only 10% of the total CPU time consumed. This is in violation with fair-fraction scheduling. Accordingly, enforcing a fair fraction is desirable in scenarios where many users concurrently work on a shared database system.

Resource management for heterogeneous queries is a frequently discussed problem in the prior art. Nevertheless, all prior art solutions have in common that they fall short of efficiently managing a heterogeneous workload on highly parallel IMDBMS because they cannot provide a larger number of processing units to time critical queries fast enough.

In "Dynamic and Load-balanced Task-Oriented Database Query Processing in Parallel Systems" (Lu and Tan. In EDBT, pages 357-372, 1992), Lu and Tan propose a dynamic and load-balanced task-oriented database query processing approach that minimizes the completion time of user queries. Lu and Tan, however, do not at all address the problem that, in the presence of heterogeneous queries, some of the queries have strict time constraints that cannot be met because other queries occupies all CPU time.

In "Dynamic Prioritization of Database Queries" (Narayanan and Waas, ICDE '11, Washington, D.C., USA, 2011. IEEE Computer Society), Narayanan and Waas present a resource management mechanism that continuously determines and re-computes an ideal target velocity of concurrent database processes based on their run-time statistics to achieve prioritization. This mechanism, however, is based on a multiplexed threading approach. According to this approach, threads do not execute queries in an order based on assigned priorities. Rather, for every query an individual thread is generated. Because the number of threads that can simultaneously be executed is limited to the number of available physical processing units, these generated threads are processed by turns. This requires pausing (also referred to as "pre-empting") active threads for certain periods of time. Prioritization is achieved by adjusting the length of the pauses for each thread. Pausing, however, leads to what is referred to as context switches. A context switch is the process of storing and restoring the state of a process (the "state of a process" is also referred to as the "context of a process") so that execution can be resumed from the same state at a later time. Such context switches are computationally intensive. Switching from one process to another requires a certain amount of time for doing the administration, such as saving and loading registers and memory maps, updating various tables and lists. The concurrent database processes referred to by Narayanan and Waas are analytical processes. Therefore, the overhead created by the resource management mechanism of Narayanan and Waas may be tolerable because analytical processes typically require computing times in the order of seconds anyway. However, for IMDBMS running not only analytical applications but also transactional applications, such overhead is not tolerable. As has repeatedly been stated above: there are strict time constraints for transactional queries. They must be executed within milliseconds.

OBJECT OF THE INVENTION

An object of the invention is to provide a method for providing database tasks with access to CPU time of a database system so that fast execution of time critical queries is guaranteed and a fair fraction of CPU times can be allotted to each query class while the overhead that is required by the method for scheduling the tasks is kept very low. Moreover, an object of the invention is to provide a database system implementing this method and a computer program product directly loadable into a memory of a computer, the computer program product comprising software code portions for performing this method when said product is run on a computer.

SUMMARY OF THE INVENTION

This object is solved by the method according to claim 1, by the database system according to claim 16, and the computer program product according to claim 17.

The invention relates to a database-system-implemented method for providing database tasks of different classes with access to CPU time provided by worker threads of a database system. The method comprises the following steps: inserting the tasks to a queue of the database system; and executing the tasks inserted to the queue by worker threads of the database system according to their order in the queue.

Tasks are (preferably small) units of code (also referred to as instructions) that can be executed by a worker thread. A task may be identical to a query or compiled from a query. Compilation of a single query may result in one task or multiple tasks. Tasks may be undividable so that a task can be executed by only one worker thread at once.

The tasks are of different classes. Classification may occur according to task type, task origin, and other properties of the tasks. The task type of a task may be distinguished according to whether the task has been compiled from a transactional query or from an analytical query. The task origin of a task may, for example, be distinguished according to which application, which session, or which user submitted the query that is the origin of the task.

The database system may comprise a thread pool where a number of worker threads are created to execute tasks that are organized in a queue. Often, there are many more tasks than worker threads. As soon as a worker thread completes its task, it will request the next task from the queue until all tasks have been completed. The worker thread may then terminate or sleep until there are new tasks available. The number of worker threads may be static or dynamic. Preferably, the number of worker threads is static because creating a thread is associated with computational costs.

Each task in the queue waits therein until a worker thread requests it. Inserting of tasks can occur at any time. The queue builds up when a new task is inserted thereto and the queue becomes smaller when a worker thread requests a task because each inserted task that is requested by a worker thread is removed from the queue.

The method is characterized in that the queue is a priority queue; and in that the method further comprises the following steps: assigning each class to a respective priority; and in that the step of inserting the tasks to the queue includes: associating each task with the respective priority assigned to its class.

A priority queue is an abstract data type which is like a regular queue or stack data structure, but where additionally each element has a respective priority associated to it. In a priority queue, an element with high priority is served before an element with low priority. That means that priority is the primary order criterion. If two elements have the same priority, they may, for example, be served according to the order of their insertion times in the priority queue. The insertion time in the queue may, for example, be based on the time when the elements of the queue have been inserted to the queue or based on discrete timestamps when the assigned priority of the task has been adjusted last. Taking the latter insertion time criterion as a first order criterion in the priority queue can also prevent starvation of tasks in case of an overloaded database. A priority queue may support the following operations: "insert_with_priority": add an element to the queue with an associated priority; "pull_highest_priority_element": remove the element from the queue that has the highest priority, and return it. Some conventions reverse the order of priorities, considering lower values to be higher priority. More advanced implementations may support more complicated operations. There are a variety of ways to implement a priority queue, which are known from the state of the art. A priority queue may, for example, be implemented with a heap or a variety of other methods.

Inserting the tasks to the queue includes: associating each task with the respective priority assigned to its class. This means that each task that is in the queue has been associated with the respective priority that was (and may still be) assigned to its class, wherein the association advantageously occurs before or when the task was inserted to the queue. However, it is not necessary that the association is maintained for each inserted task until the respective task is executed. According to an advantageous embodiment another priority may be associated for the purpose of reordering the queue.

The method of claim 1 is advantageous because it guarantees fast execution of queries that belong to classes that are considered particularly time critical, such as transactional queries.

According to an advantageous embodiment, the method is characterized in that the queue is a priority queue; and in that the method further comprises the following steps: assigning each class to a respective priority; and in that the step of inserting the tasks to the queue includes: associating each task with the respective priority assigned to its class when or before it is inserted to the queue.

According to another advantageous embodiment, the method is characterized in that the queue is a priority queue; and in that the method further comprises the following steps: assigning each class to a respective priority; and in that the step of inserting the tasks to the queue includes: associating each task to be inserted to the queue with the respective priority assigned to its class; or, for example, associating each task to be inserted to the queue with the respective priority that is, at the time of its insertion, assigned to its class.

According to another advantageous embodiment of the invention, the method further comprises the following steps: assigning a first target CPU time fraction to a first class; and while executing the inserted tasks, repeatedly adjusting the priorities assigned to the classes so that an average CPU time fraction spent on executing tasks of the first class approximates the first target CPU time fraction.

The first target CPU time fraction is a variable that may, for example, be set manually or calculated by the database system from other parameters.

CPU time is the amount of time for which a central processing unit (CPU) was used for processing instructions of a task. The CPU time may be measured in clock ticks or seconds. The total CPU time available is more than the total real time available. If, for example, the database system has two dual-core processors and one worker thread is pinned to each of these cores, then the total CPU time available is roughly four times the real time available.

According to one embodiment, adjusting the priorities assigned to the classes only has an effect on tasks that have not been inserted to the queue at the time of adjusting yet. The tasks that have already been inserted to the priority queue keep the priority it is associated with at the time of their insertion to avoid additional overhead of reordering the queue.

The average CPU time fraction spent on executing tasks of the first class (in other words: the average CPU time fraction spent on behalf of the first class) is measurable physical state of the database system, i.e., an observable of the database system. For determining the average CPU time spent on behalf of each session at time t, different techniques may be implemented: For example, determining may involve a moving average technique, a first order exponential smoothing technique, and/or a second order exponential smoothing technique.

The moving average technique may be regarded as a finite impulse response filter used to analyse a time series data set, such as the CPU time spent on behalf of classes measured at multiple points in time. According to the moving average technique a series of averages of different subsets of the full time series data set is created. Given a time series data set and a fixed subset size, the first element of the moving average is obtained by taking the average of the initial fixed subset of the number series. Then the subset is modified by "shifting forward"; that is, excluding the first number of the series and including the next number following the original subset in the series. This creates a new subset of numbers, which is averaged. This process is repeated over the entire data series. The plot line connecting all the (fixed) averages is referred to as the moving average. A moving average is a set of numbers, each of which is the average of the corresponding subset of a larger set of datum points. A moving average may also use unequal weights for each datum value in the subset to emphasize particular values in the subset.

Any other technique suitable for smoothing out short-term fluctuations and highlight longer-term trends in time series data may be used instead of the moving average technique.

While the tasks of the queue are executed, the priorities assigned to the classes are repeatedly adjusted so that an average CPU time fraction spent on executing tasks of the first class approximates the first target CPU time fraction.

The priorities assigned to the classes may be changed so that queries of a class that has obtained less than its target fraction of the CPU time are inserted towards the front of the queue, while queries of a class that has received more than its target fraction of CPU time are inserted towards the end of the queue.

This embodiment is advantageous because it guarantees fast execution of time critical queries and ensures that a fair fraction of CPU times is allotted to each query class. In addition, the overhead created by the method is kept very low. In particular, overhead is reduced because average CPU time spent is controlled by adjusting priorities assigned to the classes and not by using expensive worker threads multiplexing, which involves preempting, pausing, or cancelling of worker threads.

This invention is not limited to methods and database systems wherein the average CPU time fraction of only a first of the classes is controlled. On the contrary, invention is also directed at methods and database systems wherein a plurality or all of the classes are controlled in an according manner. According to an embodiment of the invention, the method further comprises the following steps: assigning a second target CPU time fraction to a second class; and while executing the inserted tasks, repeatedly adjusting the priorities assigned to the classes so that the average CPU time fraction spent on executing tasks of the first class approximates the first target CPU time fraction and the average CPU time fraction spent on executing tasks of the second class approximates the second target CPU time fraction. According to this embodiment at least the average CPU time fraction of the first and the second class is controlled.

According to an advantageous embodiment of the invention and in accordance with the concepts of control theory, the worker threads and the queue of the database system may be regarded as a dynamical system with an input, the input being the priorities assigned to the classes, the average CPU time fraction spent on executing queries of the first class type being a controlled observable of the dynamical system. This controlled observable needs to follow or approach a reference, namely the first target CPU time share. For this purpose, the input to the system, namely the priorities assigned to the classes, is adjusted so that the observable approaches or follows the reference. Four functions may repeatedly be carried out: measuring, comparing, computing, and adjusting. The observable is measured. Then, the measured observable is compared to the reference. An adjustment of the input is computed, for example, from the difference between the measured observable and the reference. The adjusted input is applied to the dynamical system so that the observable approaches the reference.

According to another embodiment of the invention, at least two of the classes are dynamic classes; in that the method further comprises the following steps: assigning each of the dynamic classes to a respective target CPU time fraction; and in that the step of adjusting includes the following step: while executing the inserted tasks, repeatedly adjusting the priorities assigned to the dynamic classes so that each average CPU time fraction spent on executing tasks of one of the dynamic classes approximates the respective target CPU time fraction.

The classes may be assigned to priorities so that each class is assigned to a priority and each inserted task is indirectly assigned to a priority.

The dynamic classes may be assigned to target CPU time fractions so that each dynamic class is assigned to a target CPU time fraction. The target fraction of CPU time for each dynamic class can be set manually or calculated by the database system.

The priorities assigned to the dynamic classes are repeatedly adjusted so that average CPU time fractions spent on executing tasks of the dynamic classes approximate the respective target CPU time fractions. This means that, for each dynamic class, the average CPU time fraction spent executing tasks thereof approximates the target CPU time fraction thereto.

According to another advantageous embodiment, the method further comprises one of the following steps: while executing the inserted tasks, repeatedly adjusting the priorities assigned to the classes and the order of the queue so that an average CPU time fraction spent on executing tasks of the first class approximates the first target CPU time fraction; while executing the inserted tasks, repeatedly adjusting the priorities assigned to the classes and the order of the queue so that the average CPU time fraction spent on executing tasks of the first class approximates the first target CPU time fraction and the average CPU time fraction spent on executing tasks of the second class approximates the second target CPU time fraction; and while executing the inserted tasks, repeatedly adjusting the priorities assigned to the classes and the order of the queue so that each average CPU time fraction spent on executing tasks of one of the dynamic classes approximates the respective target CPU time fraction. According to this embodiment, not only the priorities are adjusted but also the order of the queue. This embodiment is advantageous because it prevents that tasks that have initially been inserted to the priority queue with low priority to be overtaken by tasks of the same class that have been inserted to the priority queue with high priority. The order of the queue may be changed so that queries of a class that has obtained less than its target fraction of the CPU time are moved towards the front of the queue, while queries of a class that has received more than its target fraction of CPU time are moved towards the end of the queue.

According to another advantageous embodiment of the invention, the step of assigning includes: assigning a static priority to at least one class of the classes that is not a dynamic class. For example, a class of tasks may statically be assigned to the highest priority. In particular, tasks that belong to transactional queries may statically be assigned the highest priority so as to ensure that transactional queries are executed as fast as possible.

According to another advantageous embodiment of the invention, the step of executing is performed so that each worker thread fetches a task from the queue when it is idle, wherein it fetches the inserted task that is of highest order according to the order based on the priorities assigned to the inserted tasks.

According to another advantageous embodiment of the invention, an inserted task is of highest order according to the order based on the priorities assigned to the inserted tasks, when it has the highest priority of all inserted tasks and, if there is more then one inserted task having the highest priority, when it has been inserted in the queue earlier than all other inserted tasks that have the highest priority.

According to another advantageous embodiment of the invention, the average CPU time fraction is measured as a fraction of the CPU time spent on executing tasks of all classes or of certain classes.

According to another advantageous embodiment of the invention, the step of adjusting includes: determining the first average CPU time fraction; calculating a difference between the first average CPU time fraction and the first target CPU time fraction; and adjusting the order of the queue based on the calculated difference.

According to another advantageous embodiment of the invention, the step of adjusting is repeated at regular intervals.

According to another advantageous embodiment of the invention, the step of inserting includes: receiving queries; compiling tasks from the received queries, wherein executing of a task requires equal or less resources than executing a query; and inserting the tasks in the queue.

Compared to scheduling whole queries, a task-based approach provides two main advantages: better load balancing on a multiprocessor system, as well as more control over progress of query execution based on priorities. The second advantage is achieved because splitting queries into small units of work introduces natural scheduling intervals during query execution, where lower priority queries can be paused to run higher priority queries without the need to cancel or preempt the low priority query. Assuming a sufficiently small task size, processing units can be freed quickly to execute incoming high priority queries.

According to another advantageous embodiment of the invention, the step of executing includes: removing an inserted task from the queue when one of the worker threads starts executing it.

According to another advantageous embodiment of the invention, the step of inserting is carried out so that, whenever the system receives a new task or query, the new task or query is added, in particular even when the step of executing is simultaneously being carried out.

According to another advantageous embodiment of the invention, the step of executing is performed so that no worker thread executing a task is stopped or paused or cancelled until executing the task is completed. This is advantageous because stopping or pausing or cancelling the executing of tasks is computational expensive.

According to another advantageous embodiment of the invention, the step of executing is performed so that at any time each worker thread executes one task at most.

According to another advantageous embodiment of the invention, the number of worker threads of the database system is static. This is advantageous because creating and destroying worker threads is expensive.

According to another advantageous embodiment of the invention, each of the worker threads is pinned to another core of the database system. This is advantageous because all of the worker threads can execute tasks simultaneously without making use of computational expensive thread multiplexing.

The invention further relates to a database system, comprising: a queue; and worker threads for providing CPU time; wherein the database system is suitable for implementing a method for providing database tasks with access to the CPU time, the method comprising the following steps: inserting the tasks to a queue of the database system; and executing the tasks added to the queue by worker threads of the database system according to their order in the queue; characterized in that the method further comprises the following steps: in that the queue is a priority queue; and in that the method further comprises the following steps: assigning each class to a respective priority; in that the step of inserting the tasks to the queue includes: associating each task with the respective priority assigned to its class.

The invention further relates to a non-transitory computer program product directly loadable into a memory of a computer, the computer program product comprising software code portions for performing the method of claim 1 when said product is run on a computer.

DETAILED DESCRIPTION

In the following, various embodiments of the present invention are described, by way of example, with reference to the accompanying figures, in which.

SIMPLIFIED MODEL

Figure 1:
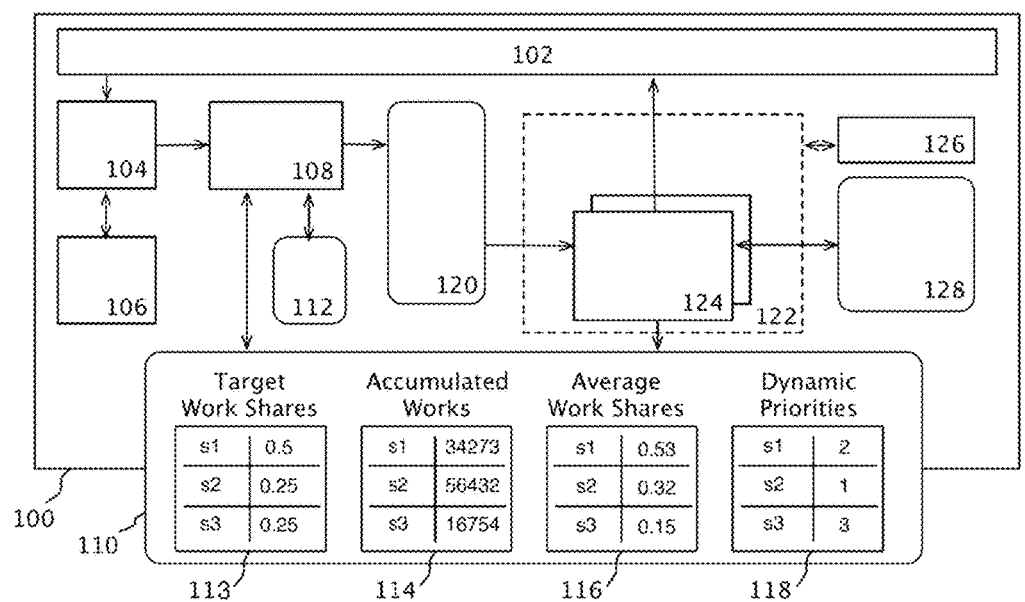
FIG. 1 is a block diagram of an embodiment of a database system according to the invention.

This section provides a simplified model and definitions derived therefrom, to which reference will later be made in the course of describing the various embodiments of the invention.

For theoretical considerations, reference is made to the following simplified model. According to this model, a database management system runs on a server with N worker threads and S concurrently active database sessions for an interval T. Queries and tasks are classified according to the sessions that have issued them so that each session is assigned to a class. Each class that is assigned to a session is a dynamic class. Each session $s_i \in S$ is assigned with a priority $p_i$ and a set of executed queries $Q_i(t)$ at any point in time $t \in T$. Each time a query q finished, it is added to $Q_i$. Queries arrive in an unpredictable manner. Therefore, the database management system has no knowledge about the future arrival of queries. Each query $q_{i,j} \in Q_i$ is defined by a set of tasks $O_{i,j}$ and an arrival time $t_{i,j}$. The tasks are sequentially executed by the worker threads so that each task $o_{i,j,n}$ is executed by one of the worker threads $n_i \in N$. Each executed task $o_{i,j,n}$ is associated with an amount of CPU time $w_{i,j,n}$ that has been spent on executing that task (the symbol "w" is used because "CPU time" may also be referred to as "work"). A task has exclusive access to a single processing unit and cannot be preempted.

For each session $s_i$ the CPU time $w_i$ that the worker threads have spent on behalf of this session at a time t is defined as $$w_i(t) = \sum_{q_{i,j} \in Q_i(t)} \sum_{o_{i,j,n} \in O_{i,j}} w_{i,j,n} \qquad (1)$$

and the total CPU time W that the worker threads have spent on behalf of all sessions is defined as $$W(t) = \sum_{s_i \in S} w_i(t) \qquad (2)$$

The total CPU time fraction $ws_i$ of a session $s_i$ for time interval [0, t] is defined as $$ws_i(t) = \frac{w_i(t)}{W(t)} \qquad (3)$$

Each session has a target fraction $ts_i$. A relative fraction deviation of $ws_i$ from $ts_i$ defined as $$\Delta s_i(t) = \frac{ts_i - ws_i(t)}{ts_i} \qquad (4)$$

Based on these considerations and findings, a mathematical problem to be solved may be formulated as follows:

Let $S=\{s_1, \ldots, s_n\}$ be the set of active database sessions in an interval T with priorities $p_i$ and queries $Q_i$, executed on a database with N processing nodes. The problem to solve is to provide an assignment of processing units to tasks $o_{i,j,n}$ during T that minimizes the overall deviation of the CPU time fraction from the target fraction over an interval T:

$$\Delta S = \int_0^T \sum_{s_i \in S} |ts_i - ws_i(t)| \qquad (5)$$

The present invention is based not only on the definition of this mathematical problem, but also on the finding that, for any given solution to the mathematical problem, namely different embodiments of database resource management systems, there are scenarios, in which the results produced by the system are far from optimal. This is mainly because, according to this model, queries arrive in an unpredictable manner and tasks derived from the queries cannot be preempted. Competitive-analysis or worst-case analysis will therefore produce largely meaningless results. In contrast, the present invention provides a database management system that follows a heuristic approach, according to which the solution to the above-defined shared query execution problem is approximated.

Example Architecture

This section describes various embodiments of the present invention.

FIG. 1 shows a block diagram of an embodiment of a database system according to the invention.

According to an advantageous embodiment of the invention, the database system is an in-memory-database-management-system (generally abbreviated as IMDBMS) in accordance with the system model described in "SanssouciDB: An In-Memory Database for Processing Enterprise Workloads" (Hasso Plattner. In BTW, pages 2-21, 2011). Therein data is physically stored in main memory 128, the stored data being decomposed into a column-oriented structure. To achieve high read and write performance, an insert-only approach is applied and the data store is split in two parts, a read optimized main partition and a write optimized differential store (Jens Krueger, Changkyu Kim, Martin Grund, Nadathur Satish, David Schwalb, Jatin Chhugani, Hasso Plattner, Pradeep Dubey, and Alexander Zeier. Fast Updates on Read-Optimized Databases Using Multi-Core CPUs. In PVLDB, Volume 5, No. 1, pages 61-72, 2011). A multi version concurrency control 126 based on transaction IDs is used to determine which records are visible to each transaction when multiple transactions run in parallel (Hasso Plattner. SanssouciDB: An In-Memory Database for Processing Enterprise Workloads. In BTW, pages 2-21, 2011). The invention is, however, not tied to specific architectural details of the database. It can be easily be generalized and applied to other architecture.

According to an advantageous embodiment of the invention, the execution of queries is split in small atomic tasks that can generally be executed in parallel. For this purpose, the database system has a task-based query execution framework 100, which is referred to as TAMEX 100. TAMEX 100 is implemented based on HYRISE (Grund et al. HYRISE: a main memory hybrid storage engine. Proc. VLDB Endow, 4(2):105-116, November 2010.). TAMEX comprises a database connection service 102 for receiving queries, a query compiler 104 and a query transformer 106 for compiling and transforming received queries into a set of atomic tasks. Task-based query execution according to TAMEX 100 is characterized in that a query, which is received through the database connection service 102, is compiled and transformed into a set of atomic tasks by the query compiler 104 and the query transformer 106. These tasks may have data dependencies, but otherwise can be executed independently. Such an atomic task is considered as the unit for scheduling. TAMEX 100 adopts this concept by transforming incoming queries into a directed acyclic graph of tasks in the query compiler 104 and the query transformer 106 and schedules these tasks based on priorities in task scheduler 108. For TAMEX 100, HYRISE is extended to support parallel execution of queries, as well as intra-query parallelism, based on multi-threading. The task scheduler 108 assigns all ready tasks to a priority queue; all tasks with unmet dependencies are placed into a wait set 112 until they become ready.

Worker threads 124 of a thread pool 122 take the tasks from the queue and execute them. Each worker thread 124 is assigned to a physical processing unit. Each worker thread 124 may execute one and only one task at once.

According to another advantageous embodiment of the invention, one of the classes is statically assigned with the highest priority. When a task of this class is added into the priority queue and there are no other tasks assigned with highest priority in the queue, it is scheduled to be executed by the worker threads immediately when a worker thread is idle or as soon as a worker thread has finished executing a task previously assigned thereto. While this static scheduling approach does effectively prioritize a query class over another, it cannot enforce a fair fraction of resources if queries with similar priorities are issued.

According to another advantageous embodiment of the invention, TAMEX 100 is configured so that priorities are adjusted dynamically to enforce a given resource fraction for query classes. For this purpose TAMEX 100 comprises a shared query scheduler 108, which is described in the following. This dynamic shared query scheduler 108 is advantageous because it is capable of scheduling queries from independent sessions so that the resulting distribution of CPU time is in accordance with prescribed target CPU time fractions 113. Good scheduling performance is achieved by dynamically re-calculating priorities of the different queries of independent sessions so that resources distribution is improved. Since scheduling of queries is a time-critical operation, special care is taken in optimizing these operations to minimize the impact of dynamically adjusting the priorities.

According to an advantageous embodiment of the invention, each class can selectively be assigned to either a dynamic or a static priority so that there may simultaneously be static and dynamic classes. For example, a static high priority can be assigned to the class of transactional queries. As a result, high throughput for transactional queries is always guaranteed, while the remaining CPU time is fairly distributed among other classes according to target CPU time fractions assigned to them. Even in this embodiment of the invention, scheduling overhead remains very small.

According to an advantageous embodiment of the invention, for each session, the CPU time spent on query processing (accumulated CPU time 114) is measured and the average CPU time fractions 116 and the relative fraction deviation $\Delta s_i(t)$ for each session $s_i(t)$ are determined at certain points in time t. Based on the relative fraction deviation, dynamic priorities 118 are assigned to the queries so that the average CPU time fractions 116 approximate the prescribed target CPU time fractions 113 and the relative fraction deviation is minimized.

According to an advantageous embodiment of the invention, for determining the average CPU time fractions spent on behalf of each session, the moving average technique is employed. Therefor, the CPU time processed on behalf of each session is accumulated after a task has been completed. Interval CPU time fractions are determined repeatedly at fixed time intervals. The average CPU time fraction at a time t is defined as the average of the interval CPU time fractions over the last/time intervals of duration $\Delta t$:

$$ws_i(t) = \frac{1}{l} \sum_{t \in \{t-(l-1)\Delta t, \ldots, t\}} \frac{w_i(t)}{W(t)} \quad (6)$$

where $w_i(t)$ defines the CPU time executed by the worker threads on behalf of session i over the time period $]t-\Delta t, t]$. For assigning the dynamic priorities to the sessions, the sessions are sorted according to their CPU time fraction deviations. The priorities of the sessions are assigned accordingly. The moving average technique introduces two parameters: the first parameter is the window length l of the moving average, which defines the weighting of the currently determined CPU time fractions with respect to the previously determined CPU time fractions; and the second parameter is the interval length i, which defines how frequently the CPU time fractions are determined and the priorities are adjusted.

According to an advantageous embodiment of the invention, the database system keeps track of the target CPU time fraction for each session 113, the CPU time processed for each session in the current time interval (also referred to as accumulated CPU time) 114, the average CPU time fraction 116 and the dynamic priorities 118. After a task is completed, the execution time of this task is added to the accumulated CPU time for the corresponding session. At the end of an interval, an update process calculates the relative CPU time fraction deviation and assigns the dynamic priorities accordingly to minimize the deviation in the next interval.

According to an advantageous embodiment of the invention, the update process consists of the following steps: calculating the interval CPU time fractions for the current time interval, namely the interval comprising the time between the time point of calculation and the time point that lies the length of the interval before that time point of calculation. This is accomplished by resetting the accumulated CPU time to zero once the accumulated CPU time has been read for the purpose of calculating the interval CPU time fractions. Then the average CPU time fraction according to equation (6) is calculated. This is accomplished by keeping, for every session, a list of l elements wherein, every time that the update process is carried out, the calculated interval CPU time fraction is added to the end of the list and the first element of the list is removed from the list. In this case the average CPU time fraction of a session is simply the average of all list elements relating to this session. Then, from the calculated average CPU time fraction and the target CPU time fractions, the relative CPU time fraction deviation is calculated for each session. Finally, all sessions are sorted in descending order according to their relative CPU time fraction deviations, and dynamic priorities are assigned accordingly, giving the highest priority to the session with the highest relative CPU time fraction deviation. The worker threads 124 that execute tasks are not interrupted, disrupted, or disturbed by the update process.

FIG. 1 further shows example data recorded and the dynamic priorities determined therefrom. Session $s_3$ is assigned the highest dynamic priority 118 as it has the largest CPU time fraction deviation. If a new task is added to the ready queue by the task scheduler 108 or a task from the wait set 112 becomes ready and is added to the ready queue of the task scheduler 108, the task scheduler 108 assigns the priority of that task according to the dynamic priority of the session that that task belongs to.

According to an advantageous embodiment of the invention, the task scheduler 108 provides global state information 110 about the average CPU time of each session that is then updated by the individual execution threads as soon as a single task is finished. As a result, a higher accuracy is obtained.

A drawback of this global CPU time fraction calculation is the global dependency to accumulate the total work. To alleviate this dependency, in an advantageous embodiment of the invention, an atomic hash-map is employed that maps the individual sessions to a local counter value. This is advantageous because the local counter value is not shared among all execution threads. Rather, only those threads working on tasks of the same session require access to a common storage location of the corresponding local counter.

According to another advantageous embodiment of the invention, a copy of the session map is kept in the thread-local storage of each execution thread 124, which is only lazily collected from the task scheduler 108 once it detects an update or adjustment of the priorities assigned to the sessions. Using the thread-local approach basically avoids contention for the session based CPU time fraction completely as all manipulations are performed thread-local and only a single consumer will retrieve the individual items.

According to an advantageous embodiment of the invention, the adjustment of the dynamic priorities is triggered by the worker threads 124 notifying the task scheduler 108 when a task is finished. If the time interval for calculating an average CPU time fraction has been passed, the update process, as described above, is initiated. As the list of sessions needs to be sorted according to the relative fraction deviation, the complexity is O(n log n), with n being the number of sessions. The fair fraction scheduler according to the invention does not produce measurable overhead for up to a 1000 concurrent users.

According to another advantageous embodiment of the invention, when a session is inactive during a period of time, only active sessions, namely sessions that have issued work, are considered for adjusting the priorities. As long as the session is inactive, it will not bias the priority adjustment; when the session is reactivated, we start the calculation of the moving average again, without considering the fraction prior to the inactivity.

Experimental Results

This section provides results of experiments run on a database system with a prior art round robin task scheduler and on a database system with a fair fraction scheduler according to the invention.

A test machine is equipped with two Intel® 5670 CPUs with 6 cores each and 144 GB RAM. Three experiments are carried out on this test machine. A first and a second experiment demonstrate the effectiveness of the invention to enforce desired target fractions. A third experiment provides parameters for determining the average works fractions according to the moving average technique and recommendations for choosing them appropriately.

The first experiment is set up with two sessions, each consisting of a number of equivalent users that issue a stream of queries to the database without think time. Each query consists of two table scans and a join, whereas each operator runs in parallel up to a degree of intra-operator parallelism of 12, corresponding to the number of worker threads running in parallel. Due to a different size of input tables, the query issued by the users of session 1 (S=1) requires 40 ms processing time and the query of session 2 (S=2) 160 ms. Each query has 154 tasks, with a maximum task runtime of about 50 ms for the longer query. The experiment is carried once using a prior art round robin scheduler and once using a fair fraction scheduler according to the invention, the fair fraction scheduler enforcing an equal CPU time fraction for both sessions. Each time, the experiment ran for 60 seconds, whereas the second session started after 10 seconds and ended after 50 seconds. We have chosen the window length l of Equation 6 to be 50 and the interval for updating priorities to 0.2 seconds.

Figure 2:
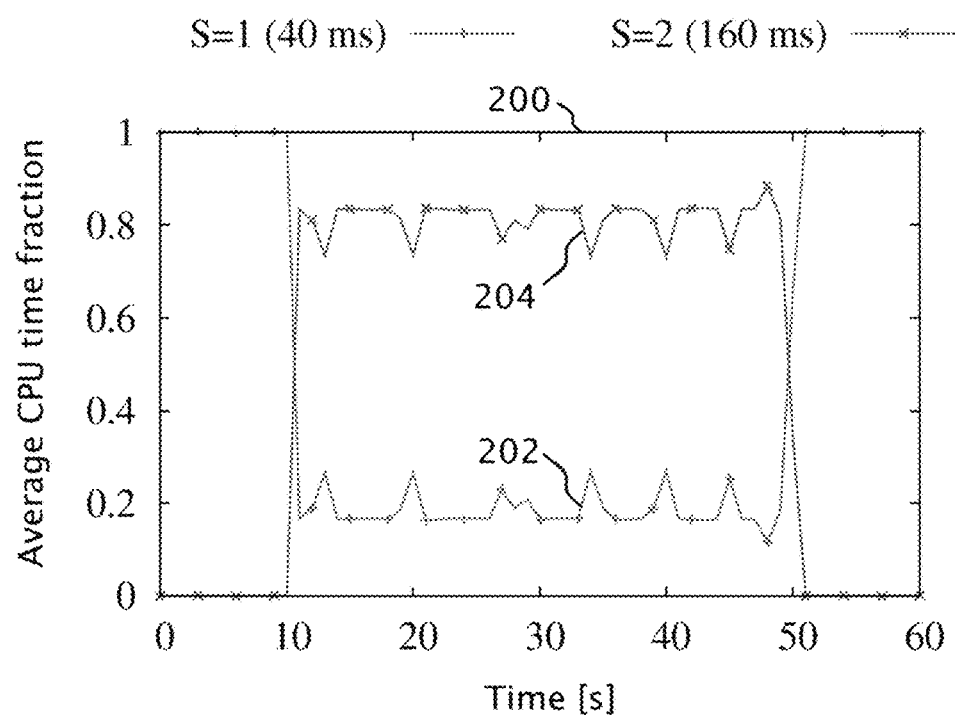
FIG. 2 is a graph representing data sets obtained from an experiment run on a database system with a prior art round robin task scheduler, wherein two sessions simultaneously issue queries with different execution times.

FIG. 2 shows the results 200 for the conventional round robin scheduler. For each second, the CPU time fraction of the last second is plotted. From the point of view of a user outside of the database, CPU time spent on executing tasks of a query is not taken into account before the entire query is finished, as opposed to when individual tasks are finished. In line with our expectations from the simulation, applying a round robin scheduler leads to a fraction equal to the ratio of the runtime of both queries, the queries of session 1 with 40 ms processing time 202 and the query the queries of session 2 with 160 ms processing time 204.

Figure 3:
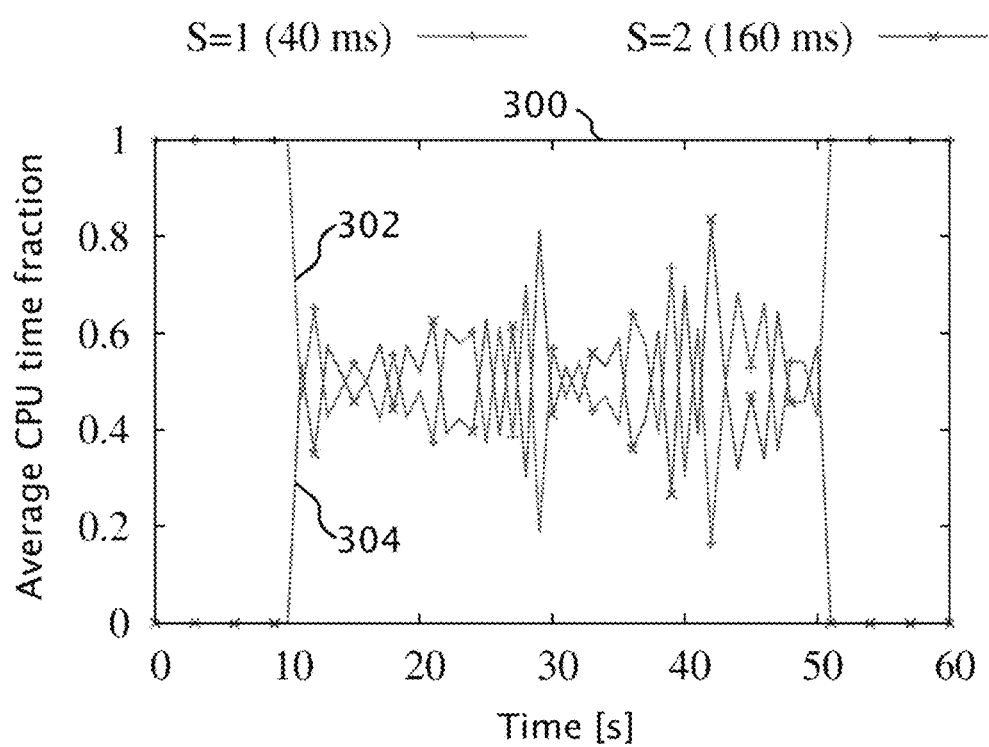
FIG. 3 is a graph representing data sets obtained from an experiment run on a database system with a fair fraction scheduler according to the invention, wherein two sessions simultaneously issue queries with different execution times.

FIG. 3 shows the results 300 for the fair fraction scheduler according to the invention. It can be seen that the dynamic prioritization of queries leads to a varying average CPU time fraction for queries of session 1 with 40 ms processing time 302 and for queries of session 2 with 160 ms processing time 304. Averaged over the time interval between 10 s and 50 s, both sessions are provided with equal CPU time fractions. To sum up: the conventional round robin scheduler fails to distribute CPU time equally among the two sessions; in contrast, the dynamic query prioritization scheduler according to the invention efficiently schedules queries with different runtimes so that CPU time is distributed equally among the two sessions.

The second experiment demonstrates the applicability of the invention to a larger number of sessions and different target CPU time fractions. This time, there are five active sessions S. In each of them, a single user issues a stream of queries, each thereof requiring 160 ms processing time.

Figure 4:
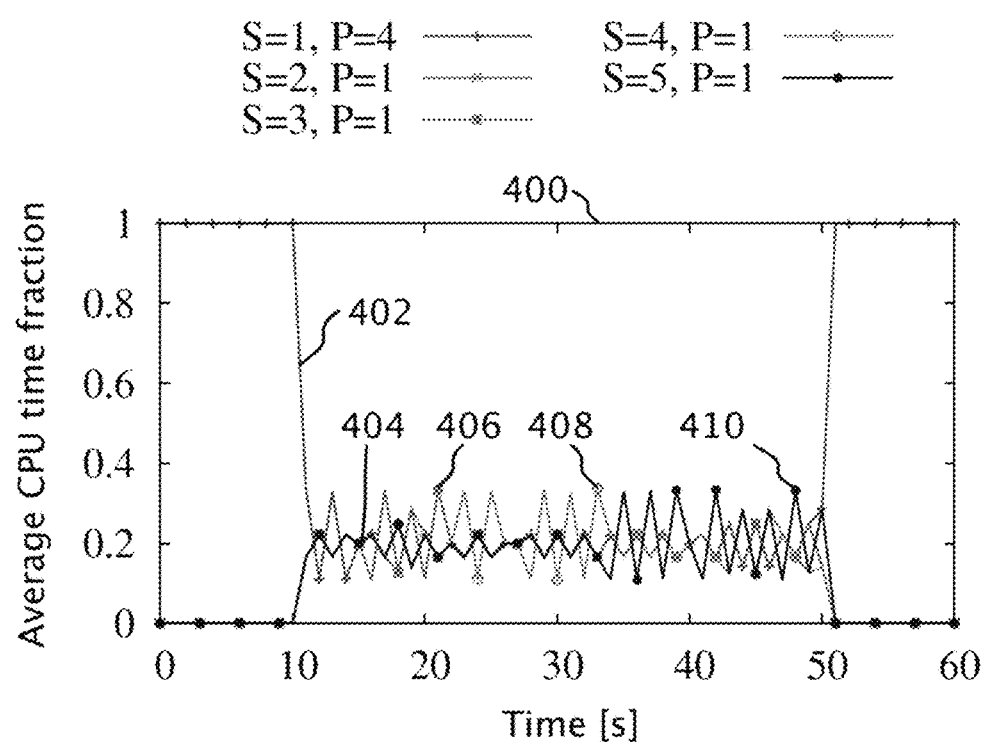
FIG. 4 is a graph representing data sets obtained from an experiment run on a database system with a fair fraction scheduler according to the invention, wherein the five sessions simultaneously issue queries with the same execution time but different target CPU time fractions.

FIG. 4 shows the results 400 where a prior art round robin scheduler was used. The CPU time fractions 402, 404, 406, 408, and 410 are shown for the case that all incoming tasks are scheduled using a prior art round robin scheduler: each query obtains approximately the same fraction of the system resources.

Figure 5:
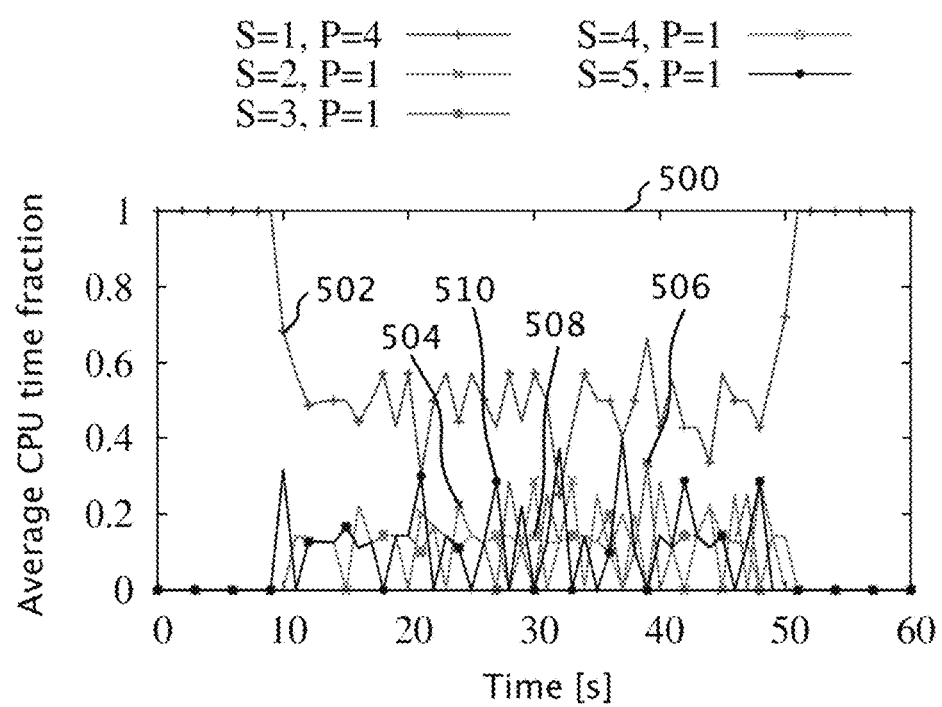
FIG. 5 is a graph representing data sets obtained from an experiment run on a database system with a fair fraction scheduler according to the invention, wherein the five sessions simultaneously issue queries with the same execution time but different target CPU time fractions.

FIG. 5 shows the results 500 where a fair fraction scheduler according to the invention was used. The fair fraction scheduler was set up in such a manner, that queries of User 1 were assigned a target CPU time fraction of 50% and the queries of the each of the remaining users were assigned a target CPU time fraction of 12.5%. As can be seen from FIG. 5, the fair fraction scheduler according to the invention is able to schedule the queries of all the different sessions according to the assigned target fraction CPU time 502, 504, 506, 508, and 510.

Figure 6:
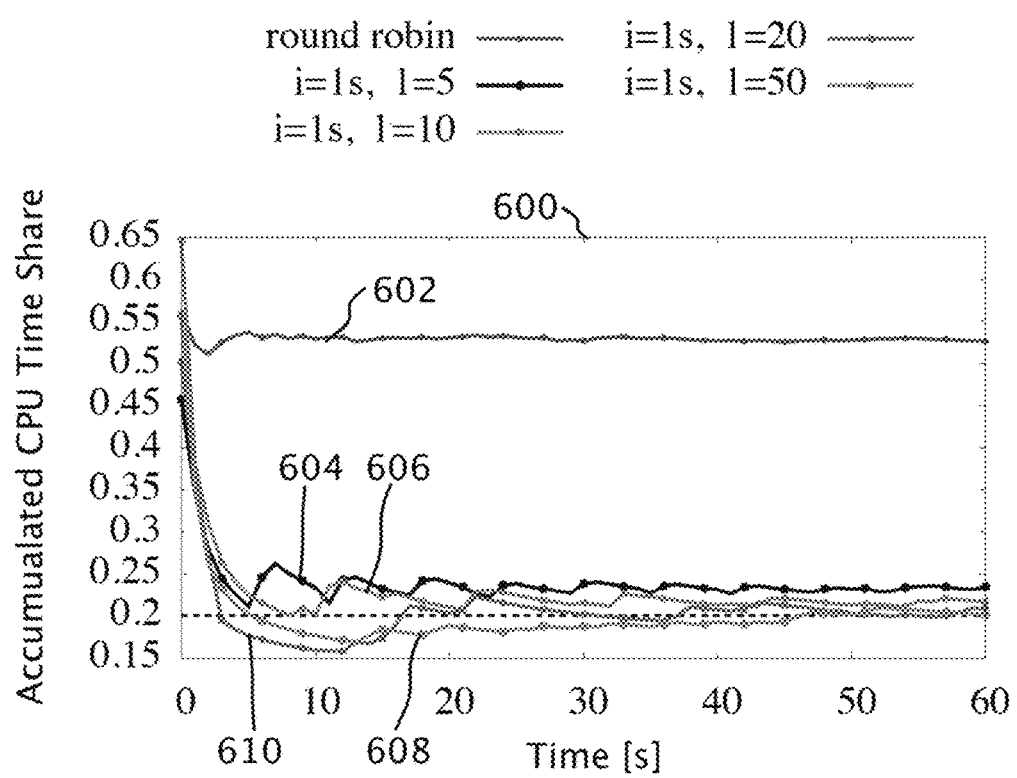
FIG. 6 is a graph representing data sets obtained from an experiment run on a database system with a fair fraction scheduler according to the invention, showing a comparison between various window lengths (l), with the interval length (i) being kept constant.
Figure 7:
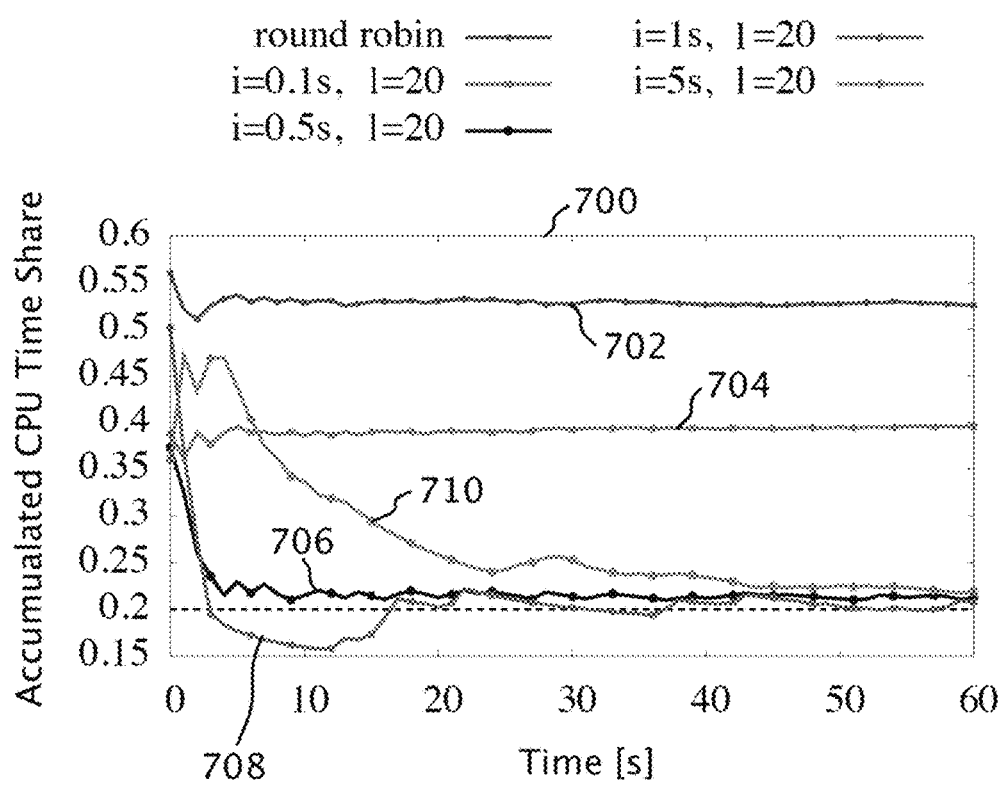
FIG. 7 is a graph representing data sets obtained from an experiment run on a database system with a fair fraction scheduler according to the invention, showing a comparison between various interval lengths (i), with the window length (l) being kept constant.

The third experiment shows that choosing the window length for the moving average and the interval length of updating priorities is a trade-off between overall accuracy and adaptation time to react on changes in the workload. For illustrative purposes, an experiment is set up consisting of five sessions with equal priorities, each session issuing a constant stream of queries. The user of one of the sessions issues queries with 160 ms runtime, the users of the other sessions issue queries with 40 ms run time. All users start at the same time. The cumulated CPU time fraction is measured from that start for 60 s. FIGS. 6 and 7 shows the results of the calculation of the relative fraction deviation using the moving average technique for the session issuing queries with 160 ms processing time.

For each of the curves shown in FIG. 6, another window length (l) has been used, while the interval length (i) has been kept constant at 1 s. As expected, a larger window length leads to a smoother curve that converges to the target fraction of 20% without major deviations (indicated by reference signs 610 and 608). A smaller window length shows more spikes, as intervals with above or below average have a larger impact on calculated CPU time fraction, but also adapts faster to workload changes (indicated by reference signs 606 and 604). However, if the window length is chosen too small, as it is here the case for length 5 (indicated by reference sign 602), the scheduler cannot enforce the overall target fraction anymore, as the sample length is too small.

For each of the curves shown in FIG. 7, another interval length (i) has been used, while the window length (l) has been kept constant at 20. For small interval lengths of 0.1 seconds and 0.5 seconds (indicated by reference sign 702 and 704), the total time interval considered (i.e., the product of window length and interval length) becomes so small, that the scheduler cannot systematically decrease the performance of the user with the long running query to enforce the target fraction. A large window length leads to less frequent adjustments of priority and therefor takes longer to converge, but is more robust to changes in the workload (indicated by reference signs 706, 708, and 710).

Choosing the parameters depends on the number of concurrent connections and task sizes and is thus workload dependent. According to an advantageous embodiment of the invention, the scheduler observes these parameters and adjusts them accordingly in order to adapt to changing workloads. The goal for the scheduler is then to choose the interval to be large enough to include a significant number of tasks from each active session, allowing for determining a trend of the CPU time fraction applying the current set of priorities. It is important to mention, that it does not depend on the entire runtime of the issued queries. The window length has to be chosen based on the average number of tasks a session executes per interval and the average execution time per task. For shorter sessions, e.g. occurring in interactive applications, a smaller window length helps to quickly balance the load and avoid that one session gets too many resources.

The invention claimed is:

1. A database-system-implemented method for providing tasks of different classes with access to CPU time provided by worker threads of a database system having a plurality of cores, the method comprising the following steps:
    inserting the tasks to a queue of the database system, each of the tasks of the queue waiting in the queue until requested by one of the worker threads, wherein a quantity of the worker threads is smaller or equal to a quantity of the plurality of cores of the database system; and
    executing the tasks inserted to the queue by worker threads of the database system according to their order in the queue;
    characterized
    in that the queue is a priority queue, in which each element of the queue is associated with a priority and in which an element with high priority is served before an element with low priority;
    in that the method further comprises the following steps: assigning each class to a respective priority;
    in that the step of inserting the tasks to the queue includes: associating each task with the respective priority assigned to its class;
    in that the database system comprises an in-memory database system that processes a plurality of queries received in a plurality of sessions, wherein the plurality of queries comprises the tasks of different classes such that a particular query includes one or more of the tasks, wherein the plurality of queries includes a plurality of analytical queries and a plurality of transactional queries, wherein an analytical query has a computing time at least four times greater than that of a transactional query; and
    in that executing the tasks according to the priority in the priority queue results in fair-fraction scheduling between the plurality of sessions for the plurality of analytical queries and the plurality of transactional queries.

2. The method according to claim 1, characterized
    in that the method further comprises the following steps: assigning a first target CPU time fraction to a first class; and
        while executing the inserted tasks, repeatedly adjusting the priorities assigned to the classes so that an average CPU time fraction spent on executing tasks of the first class approximates the first target CPU time fraction.

3. The method according to claim 2, characterized in that the method further comprises the following steps:
assigning a second target CPU time fraction to a second class; and
while executing the inserted tasks, repeatedly adjusting the priorities assigned to the classes so that the average CPU time fraction spent on executing tasks of the first class approximates the first target CPU time fraction and the average CPU time fraction spent on executing tasks of the second class approximates the second target CPU time fraction.

4. The method according to claim 2, characterized in that at least two of the classes are dynamic classes;
in that the method further comprises the following steps:
assigning each of the dynamic classes to a respective target CPU time fraction; and
in that the step of adjusting includes the following step:
while executing the inserted tasks, repeatedly adjusting the priorities assigned to the dynamic classes so that each average CPU time fraction spent on executing tasks of one of the dynamic classes approximates the respective target CPU time fraction.

5. The method according to claim 2, characterized in that the method further comprises one of the following steps:
while executing the inserted tasks, repeatedly adjusting the priorities assigned to the classes and the order of the queue so that an average CPU time fraction spent on executing tasks of the first class approximates the first target CPU time fraction;
while executing the inserted tasks, repeatedly adjusting the priorities assigned to the classes and the order of the queue so that the average CPU time fraction spent on executing tasks of the first class approximates the first target CPU time fraction and the average CPU time fraction spent on executing tasks of the second class approximates the second target CPU time fraction; and
while executing the inserted tasks, repeatedly adjusting the priorities assigned to the classes and the order of the queue so that each average CPU time fraction spent on executing tasks of one of the dynamic classes approximates the respective target CPU time fraction.

6. The method according to claim 2, characterized in that the step of adjusting includes:
determining the first average CPU time fraction;
calculating a difference between the first average CPU time fraction and the first target CPU time fraction; and
adjusting the order of the queue based on the calculated difference.

7. The method according to claim 6, characterized in that the step of adjusting is repeated at regular intervals.

8. The method according to claim 1, characterized in that the step of inserting includes:
receiving queries;
compiling tasks from the received queries, wherein executing of a task requires equal or less resources than executing a query; and
inserting the tasks in the queue.

9. The method according to claim 1, characterized in that the step of executing includes:
removing inserted tasks from the queue when they are executed by the worker threads.

10. The method according to claim 1, characterized in that the step of inserting is carried out so that, whenever the system receives a new task or query, the new task or query is inserted, in particular, even when the step of executing is simultaneously being carried out.

11. The method according to claim 1, characterized in that the step of executing is performed so that no thread executing a task is stopped or paused or cancelled until executing the task is completed.

12. The method according to claim 1, characterized in that the step of executing is performed so that at any time each worker thread executes one task at most.

13. The method according to claim 1, characterized in that the number of worker threads of the database system is static.

14. The method according to claim 1, characterized in that each of the worker threads is pinned to another core of the database system.

15. The method according to claim 1, characterized in that the step of assigning includes: assigning a static priority to at least one class of the classes that is not a dynamic class.

16. A database system, comprising:
at least one central processing unit (CPU), wherein the at least one CPU has a plurality of cores,
wherein the at least one central processing unit executes a method for providing database tasks with access to CPU time, the method comprising the following steps:
inserting the tasks to a queue of the database system, each of the tasks of the queue waiting in the queue until requested by one of the worker threads, wherein a quantity of the worker threads is smaller or equal to a quantity of the plurality of cores of the database system; and
executing the tasks inserted to the queue by worker threads of the database system according to their order in the queue;
characterized
in that the queue is a priority queue, in which each element of the queue is associated with a priority and in which an element with high priority is served before an element with low priority;
in that the method further comprises the following steps: assigning each class to a respective priority;
in that the step of inserting the tasks to the queue includes: associating each task with the respective priority assigned to its class;
in that the database system comprises an in-memory database system that processes a plurality of queries received in a plurality of sessions, wherein the plurality of queries comprises the tasks of different classes such that a particular query includes one or more of the tasks, wherein the plurality of queries includes a plurality of analytical queries and a plurality of transactional queries, wherein an analytical query has a computing time at least four times greater than that of a transactional query; and
in that executing the tasks according to the priority in the priority queue results in fair-fraction scheduling between the plurality of sessions for the plurality of analytical queries and the plurality of transactional queries.

17. A non-transitory computer program product directly loadable into a memory of a computer, the computer program product comprising software code portions for performing a method when said product is run on the computer, the computer implementing a database system having a plurality of cores, the method for providing tasks of different classes with access to CPU time provided by worker threads of the database system, the method comprising the following steps:

inserting the tasks to a queue of the database system, each of the tasks of the queue waiting in the queue until requested by one of the worker threads, wherein a quantity of the worker threads is smaller or equal to a quantity of the plurality of cores of the database system; and executing the tasks inserted to the queue by worker threads of the database system according to their order in the queue;

characterized in that the queue is a priority queue, in which each element of the queue is associated with a priority and in which an element with high priority is served before an element with low priority;

in that the method further comprises the following steps: assigning each class to a respective priority;

in that the step of inserting the tasks to the queue includes: associating each task with the respective priority assigned to its class;

in that the database system comprises an in-memory database system that processes a plurality of queries received in a plurality of sessions, wherein the plurality of queries comprises the tasks of different classes such that a particular query includes one or more of the tasks, wherein the plurality of queries includes a plurality of analytical queries and a plurality of transactional queries, wherein an analytical query has a computing time at least four times greater than that of a transactional query; and in that executing the tasks according to the priority in the priority queue results in fair-fraction scheduling between the plurality of sessions for the plurality of analytical queries and the plurality of transactional queries.

18. The method according to claim 1, wherein data is stored in a main memory of the in-memory database management system, and wherein the data is decomposed into a column-oriented structure.

19. The method according to claim 1, wherein each query of the plurality of queries includes more than one of the plurality of tasks.

20. The method according to claim 1, wherein the fair-fraction scheduling comprises a fair fraction of the CPU time allocated to each class.

* * * * *